(12) United States Patent
Schank et al.

(10) Patent No.: US 8,657,228 B2
(45) Date of Patent: Feb. 25, 2014

(54) METHOD AND APPARATUS FOR ACTIVELY MANIPULATING AERODYNAMIC SURFACES

(75) Inventors: Troy C. Schank, Keller, TX (US); Peter H. Kitzinger, Grapevine, TX (US); Paul B. Sherrill, Grapevine, TX (US); Thomas C. Parham, Colleyville, TX (US); David A. Popelka, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 1 day.

(21) Appl. No.: 13/577,633

(22) PCT Filed: Nov. 4, 2010

(86) PCT No.: PCT/US2010/055367
§ 371 (c)(1),
(2), (4) Date: Aug. 7, 2012

(87) PCT Pub. No.: WO2012/060836
PCT Pub. Date: May 10, 2012

(65) Prior Publication Data
US 2012/0305698 A1    Dec. 6, 2012

Related U.S. Application Data

(63) Continuation-in-part of application No. PCT/US2010/054910, filed on Nov. 1, 2010.

(51) Int. Cl.
*B64C 3/50* (2006.01)
*B64C 9/00* (2006.01)
*B64C 27/615* (2006.01)

(52) U.S. Cl.
USPC .......................... 244/99.2; 244/213

(58) Field of Classification Search
USPC ........... 244/99.2–99.5, 99.8, 211–217, 17.11; 416/23
See application file for complete search history.

(56) References Cited

U.S. PATENT DOCUMENTS 2,415,128 A * 2/1947 Eaton ............................ 244/215
2,457,508 A    12/1948 Todd
(Continued)

FOREIGN PATENT DOCUMENTS

JP    2001/058600 A    3/2001

OTHER PUBLICATIONS

Extended European Search Report in related European patent application No. 10859373.2, 7 pages, mailed Jul. 12, 2013.
International Search Report and the Written Opinion of the International Searching Authority mailed by ISA/USA, U.S. Patent and Trademark Office on Jan. 10, 2011 for International Patent Application No. PCT/US10/54910, 8 pages.

(Continued)

*Primary Examiner* — Tien Dinh
*Assistant Examiner* — Richard R Green
(74) *Attorney, Agent, or Firm* — James E. Walton

(57) ABSTRACT

A method and apparatus is provided, including an actuator system that may be connected to a wing frame for controlling an active element. The actuator system may include sliding elements movable along an axis parallel to the span-wise axis of the wing. The sliding elements may be connected to fixed elements and a crank element, the crank element generally comprising a beam element and a cross-axis flexure pivot element. The beam element may be offset from the pivot element so that the crank element is rotatable about the pivot element with a negative stiffness under an external force that tends to pull the sliding elements away from the fixed elements.

17 Claims, 12 Drawing Sheets

(56) References Cited

U.S. PATENT DOCUMENTS

| | | | |
|---|---|---|---|
| 2,612,329 | A | 9/1952 | Crandall et al. |
| 3,395,878 | A | 8/1968 | Westbury |
| 4,186,622 | A * | 2/1980 | Cooper .................. 244/233 |
| 6,273,681 | B1 | 8/2001 | Yamakawa |
| 6,499,690 | B1 | 12/2002 | Katayama |
| 7,464,903 | B2 * | 12/2008 | Pitt ....................... 244/99.8 |
| 2001/0035477 | A1 | 11/2001 | Fink et al. |
| 2008/0035788 | A1 | 2/2008 | Kothera |
| 2008/0035798 | A1 | 2/2008 | Kothera |
| 2008/0145221 | A1 | 6/2008 | Sun et al. |
| 2008/0202263 | A1 | 8/2008 | Holtgraver |

OTHER PUBLICATIONS

International Search Report and the Written Opinion of the International Searching Authority mailed by ISA/USA, U.S. Patent and Trademark Office on Feb. 11, 2011 for International Patent Application No. PCT/US10/55367, 10 pages.

The Theory of Symmetrical Crossed Flexure Pivots by W. H. Wittrick, Department of Aeronautical Engineering, University of Sydney, Manuscript Received Feb. 17, 1948, 15 pages.

International Preliminary Report on Patentability in related International Application No. PCT/US10/54910, 7 pages, mailed May 13, 2013.

* cited by examiner

METHOD AND APPARATUS FOR ACTIVELY MANIPULATING AERODYNAMIC SURFACES

TECHNICAL FIELD

This disclosure relates in general to the field of heavier-than-air aircraft, and more particularly to a method and apparatus for actively manipulating aerodynamic surfaces.

DESCRIPTION OF THE PRIOR ART

Emerging and future generations of rotary-wing and tilt-rotor aircraft have active elements on the blade or wing, such as trailing edge flaps and leading edge droops, which can provide a number of enhancements over passive designs. For example, active elements can be used for vibration reduction, noise reduction, and performance improvements. Actuator systems are needed to operate active elements, but actuator systems also add weight and complexity to the aircraft. Accordingly, the design of powerful, light-weight actuator systems presents significant challenges to engineers and manufacturers.

BRIEF DESCRIPTION OF THE DRAWINGS

The features believed characteristic and novel of a method and apparatus (collectively, a system) for active manipulation of aerodynamic surfaces are set forth in the appended claims. However, the system, as well as a preferred mode of use, and further objectives and advantages thereof, will best be understood by reference to the following detailed description when read in conjunction with the accompanying drawings, wherein:

While the system and apparatus for active manipulation of aerodynamic forces is susceptible to various modifications and alternative forms, the novel features thereof are shown and described below through specific example embodiments. It should be understood, however, that the description herein of specific example embodiments is not intended to limit the system or apparatus to the particular forms disclosed, but on the contrary, the intention is to cover all modifications, equivalents, and alternatives falling within the spirit and scope of the appended claims.

DESCRIPTION OF THE PREFERRED EMBODIMENT

Illustrative embodiments of the novel system are described below. In the interest of clarity, not all features of such embodiments may be described. It should be appreciated that in the development of any such system, numerous implementation-specific decisions must be made to achieve specific goals, such as compliance with system-related and business-related constraints, which will vary from one implementation to another. Moreover, it should be appreciated that such decisions might be complex and time-consuming, but would nevertheless be a routine undertaking for those of ordinary skill in the art having the benefit of this disclosure.

Reference may be made to the spatial relationships between various components and to the spatial orientation of various aspects of components as the system is depicted in the attached drawings. However, as should be recognized by those skilled in the art, the elements, members, components, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the example embodiments described herein may be oriented in any desired direction.

Figure 1:
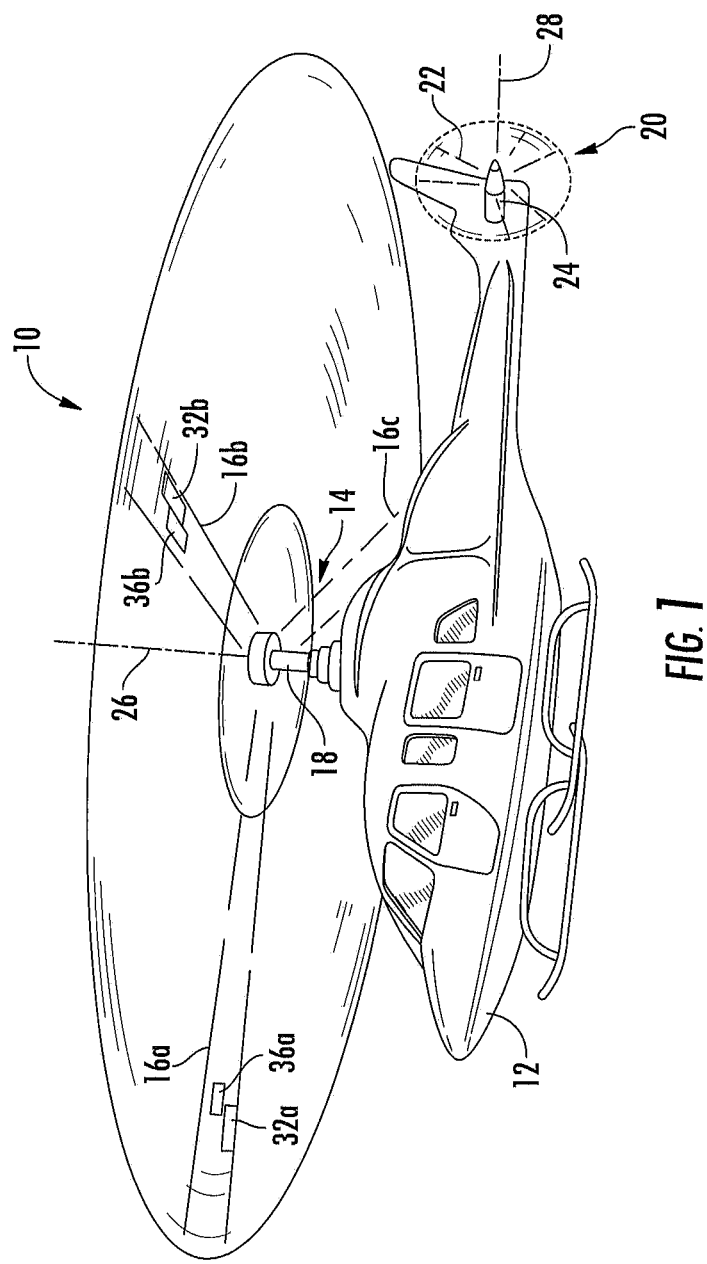
FIG. 1 is a perspective view of an example embodiment of a helicopter according to the present specification.

Referring to the appended drawings, FIG. 1 is a perspective view of an example embodiment of a helicopter 10 according to the present specification. In general, helicopter 10 has a fuselage 12 and a main rotor assembly 14, which includes main rotor blades 16a-c and a main rotor shaft 18. Helicopter 10 may also include a tail rotor assembly 20, which generally includes tail rotor blades 22 and a tail rotor shaft 24. Main rotor blades 16a-c may rotate about a longitudinal axis 26 of main rotor shaft 18. Tail rotor blades may rotate about a longitudinal axis 28 of tail rotor shaft 24. Also illustrated in FIG. 1 are flaps 32a-b and actuator systems 36a-b on main rotor blades 16a-b, respectively. Not visible in FIG. 1 are flap 32c and actuator system 36c on main rotor blade 16c.

Figure 2:
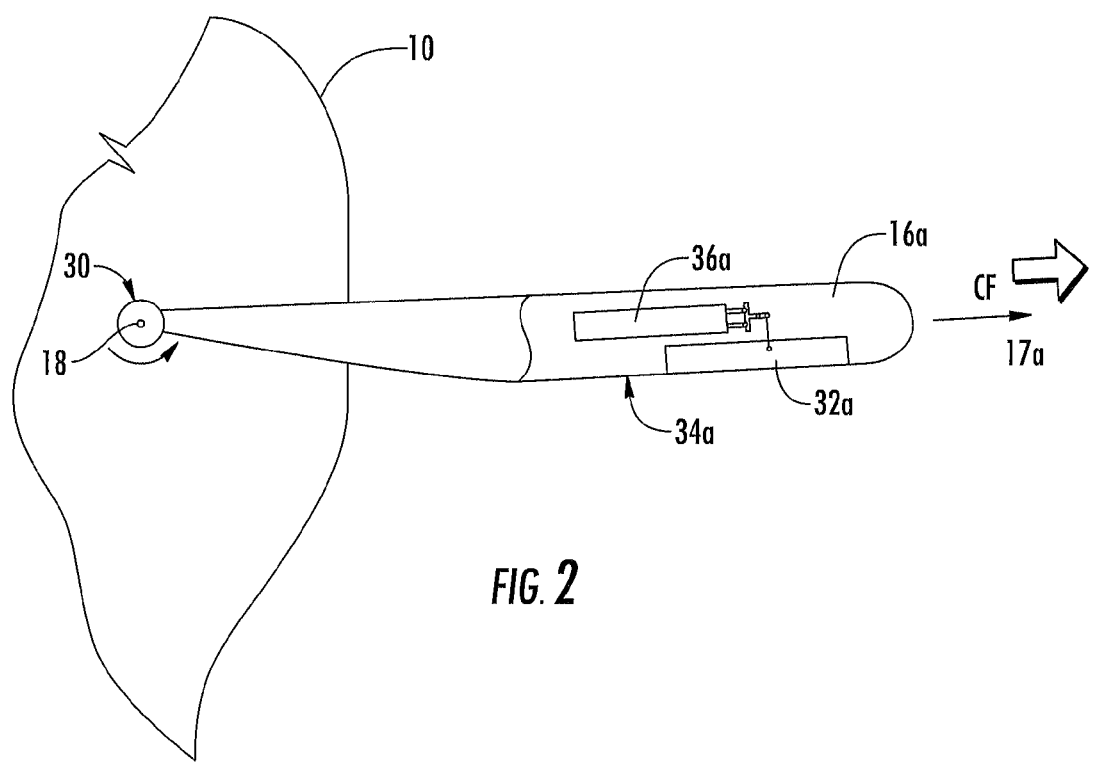
FIG. 2 is a partial top view of an example embodiment of a helicopter having an active blade element and actuator system according to the present specification.

FIG. 2 is a partial top view of helicopter 10, including main rotor blade 16a, connected to a hub 30 on main rotor shaft 18. In the example embodiment of helicopter 10, main rotor blade 16a may include additional active elements that may be used to manipulate aerodynamic surfaces, such as flap 32a. Flap 32a in the example embodiment of helicopter 10 is placed outboard along the trailing edge 34a, but may be placed in other positions according to particular design criteria. And while flap 32a is illustrated and described herein as a distinct component of main rotor blade 16a, it may also be any movable or flexible portion of main rotor blade 16a. An example embodiment of actuator system 36a is also depicted in the cut-away section FIG. 2, generally oriented parallel to a spanwise axis 17a of main rotor blade 16a. During operation, main rotor blade 16a may rotate about hub 30, while actuator system manipulates flap 32a. The rotation causes a number of reactive forces, including lift and centrifugal forces (CF).

Figure 3:
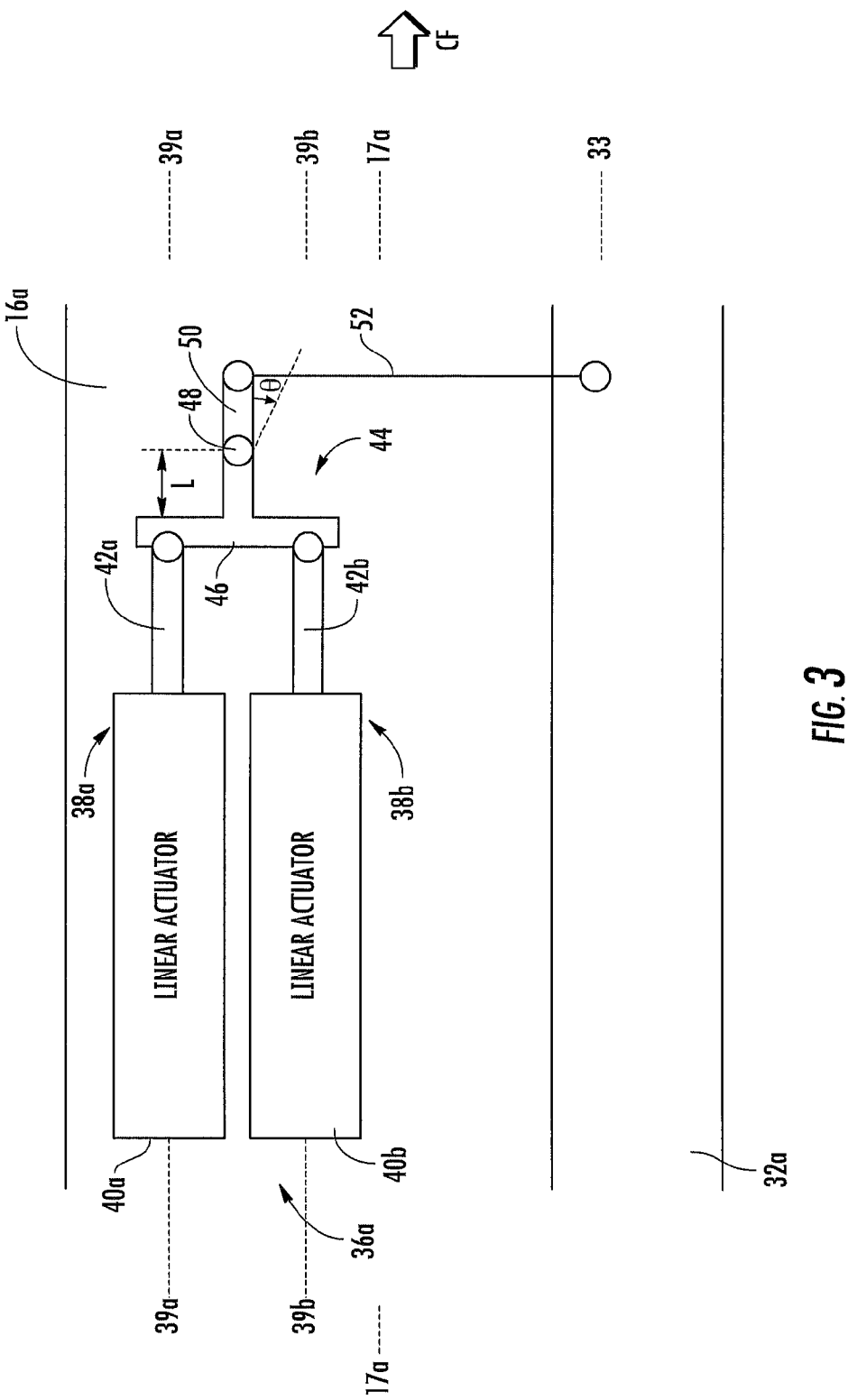
FIG. 3 is a simple top-view schematic of an example embodiment of an actuator system according to the present specification having a span-wise orientation and a parallel configuration of linear actuators in a rotor blade.

FIG. 3 is a simple top-view schematic of actuator system 36a in main rotor blade 16a. Actuator system 36a may include linear actuators 38a-b. Each linear actuator 38a-b typically includes a fixed or stationary element, such as stators 40a-b, and a moving or sliding element, such as sliders 42a-b. Stators 40a-b in the example embodiment are rigidly connected to the frame of main rotor blade 16a, and they may be identical elements or may have distinct properties for certain applications. Likewise, sliders 42a-b may be identical or have distinct properties for certain applications. Linear actuators 38a-b each has an elongated shape with a lengthwise axis 39a-b that is generally oriented parallel with span-wise axis 17a of main rotor blade 16a. In the example embodiment of FIG. 3, linear actuators 38a-b are also generally oriented parallel to each other along the span of main rotor blade 16a. Such a span-wise orientation is generally preferable to other orientations as it generally provides larger space in the blade for larger, more powerful motors with longer strokes, and better mass placement.

In actuator system 36a, a crank 44 is connected to sliders 42a-b. Crank 44 includes a beam element 46, a pivot element 48, and an arm element 50. Examples of pivot element 48 include a conventional bearing with rolling elements, an elastomeric element, a sleeve bushing, or a structural flexure. Pivot element 48 may be positioned coincident with beam element 46, or may be offset a distance L relative to beam element 46, as shown in FIG. 3. By adjusting distance L, the large centrifugal force acting on sliders 42a-b may be used advantageously to create a negative stiffness spring effect, wherein the negative spring constant, k, is proportional to the centrifugal force CF, distance L, and angular displacement $\theta$ ($-k=CF*L*\sin(\theta)/\theta$). The negative spring effect may counteract aerodynamic forces and reduce actuator power requirements, thereby also potentially reducing the mass of actuator system 36a. Arm element 50 may be rigidly attached to beam element 46, or beam element 46 and arm element may 50 be fabricated as a single element.

Figure 4:
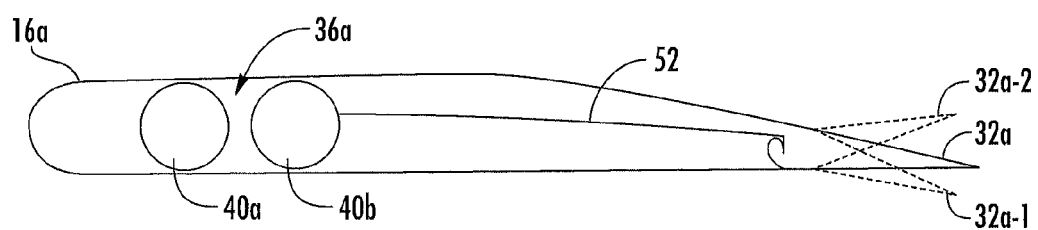
FIG. 4 is a simple side-view schematic of an example embodiment of an actuator system according to the present specification having a span-wise orientation and a parallel configuration of linear actuators in a rotor blade.

FIG. 4 is a simple side-view schematic of actuator system 36a. Stators 40a-b are preferably placed within the frame of main rotor blade 16a in parallel. Connecting rod 52 connects actuator system 36a to flap 32a through crank 44 (see FIG. 3) and sliders 42a-b (see FIG. 3). Flap 32a may rotate about an axis 33 in response to force from connecting rod 52. Alternate positions of flap 32a as it rotates about axis 33 are illustrated in phantom as flaps 32a-1 and 32a-2.

Figure 5:
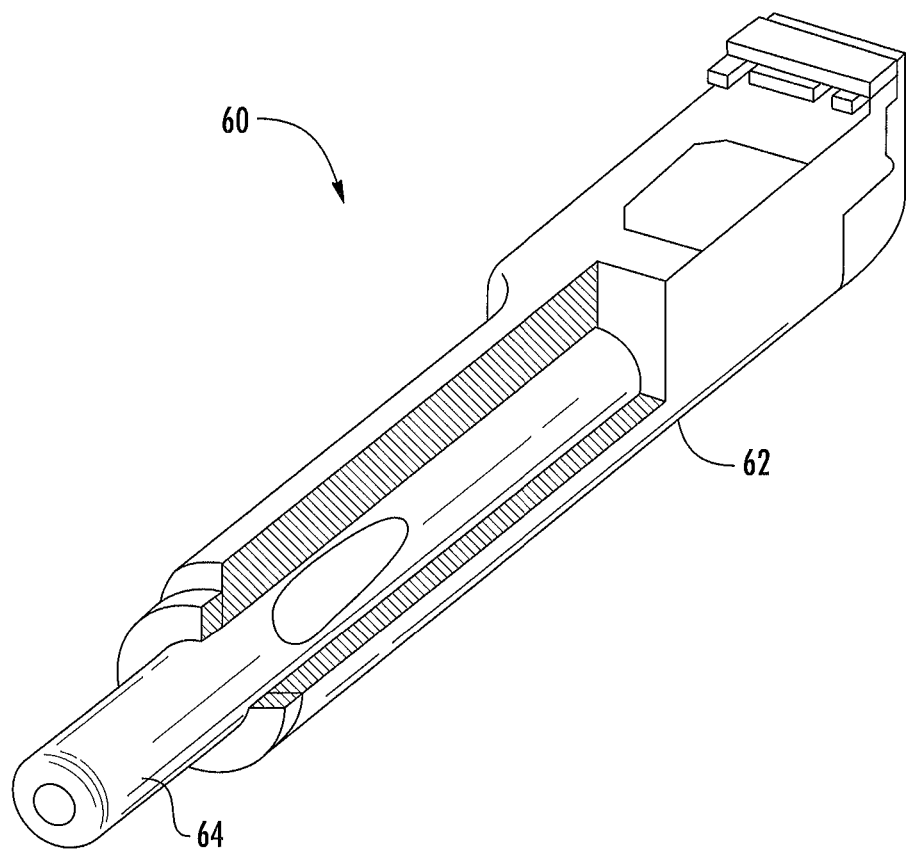
FIG. 5 is a cut-away view of an example embodiment of a linear motor actuator according to the present specification.

FIG. 5 is a cut-away view of an example embodiment of a linear actuator 60. In this embodiment, linear actuator 60 is an electromagnetic linear motor having a fixed element, stator 62, having electric coils, and an elongated, high-power permanent magnetic slider 64. The slider 64 moves and converts electrical power to useful work. The motion, position, and retention of slider 64 are controlled with electromagnetic force generated with the electric coils of stator 62. Such an actuator may provide benefits in certain applications where high bandwidth and large stroke with a small footprint are desirable. For example, an electromagnetic motor such as linear actuator 60 may be advantageous in a helicopter rotor blade where vibrations and noise are counteracted with relatively small flap deflections at high frequency, but performance is enhanced with larger deflections at a lower frequency.

During rotation of main rotor blade 16a, the centrifugal forces are carried across beam element 46 and reacted by pivot 48, effectively canceling the tendency of sliders 42a-b to sling outward because of the centrifugal forces. Crank 44 is similar to a common bell crank, and as it rotates it converts the span-wise motion of sliders 42a-b into chord-wise motion that may be used to manipulate an active element, such as flap 32a, which is connected to arm element 50 through a connecting rod 52 or similar linkage.

In operation, sliders 42a-b are actuated such that each reciprocates generally parallel to axis 17a and slider 42a moves opposite to slider 42b. Thus, as slider 42a moves in the outboard direction of main rotor blade 16a, slider 42b moves inboard. And as slider 42a moves outboard and slider 42b moves inboard, crank 44 rotates about pivot element 48, causing arm element 50 to advance toward trailing edge 34a of main rotor blade 16a. The movement of arm element 50 toward trailing edge 34a in turn causes connecting rod 52 to act on flap 32a, which may rotate about axis 33 to position 32a-1.

Conversely, as slider 42a moves inboard and slider 42b moves outboard, crank 44 rotates in the opposite direction about pivot element 48, causing arm element 50 to retreat from trailing edge 34a. The movement of arm element 50 away from trailing edge 34b in turn causes connecting rod 52 to act on flap 32a, which may rotate about axis 33 to another position, such as 32a-2.

Figure 6:
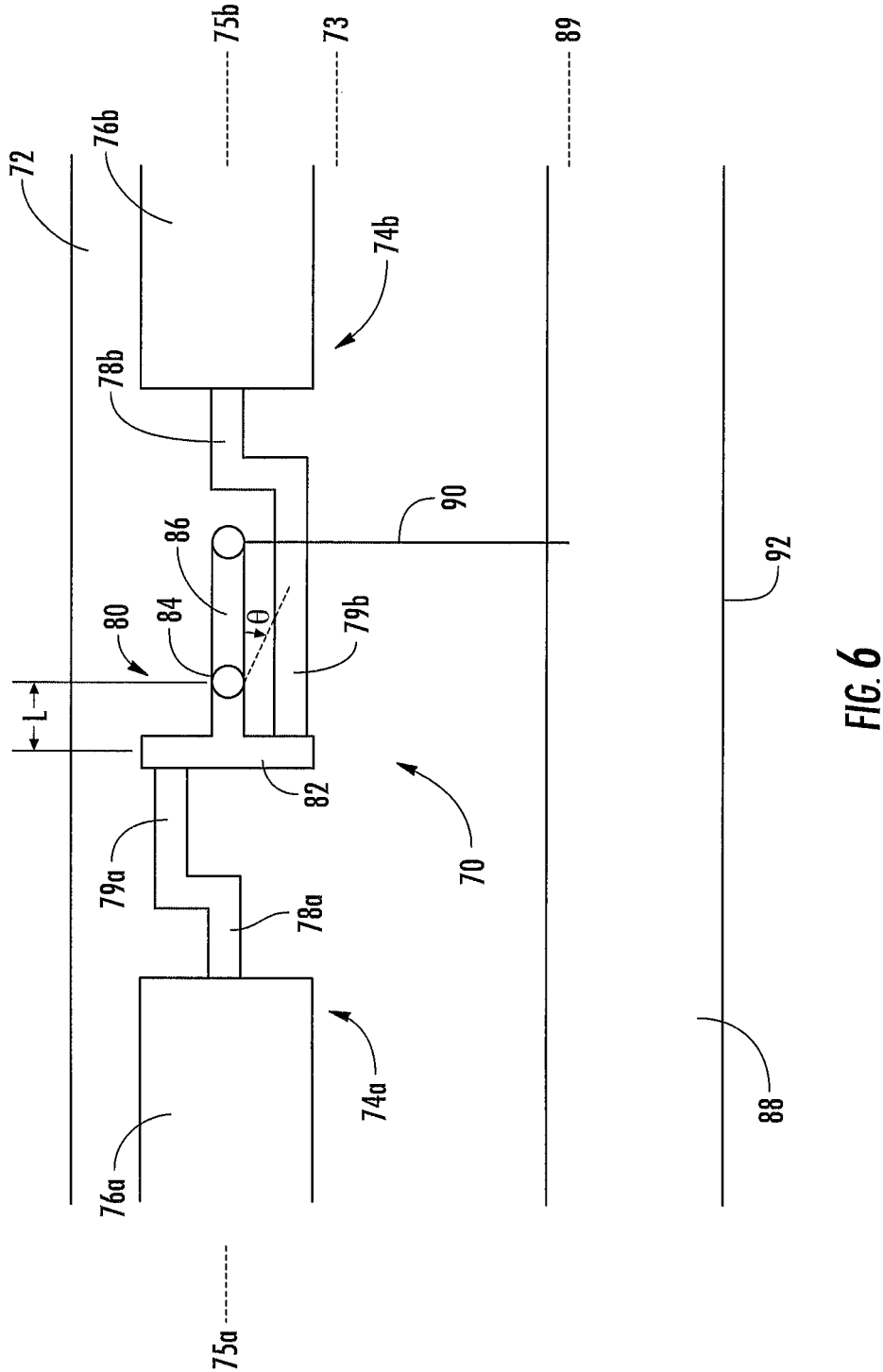
FIG. 6 is a simple top-view schematic of another example embodiment of an actuator system according to the present specification having a span-wise orientation and a serial configuration of linear actuators in a rotor blade.

FIG. 6 is a simple top-view schematic of another example embodiment of an actuator system 70 in a main rotor blade 72 according to the present specification. Actuator system 70 may include linear actuators 74a-b. Each linear actuator 74a-b typically includes a fixed or stationary element, such as stators 76a-b, and a moving element or sliding element, such as sliders 78a-b. Stators 76a-b in the example embodiment are rigidly connected to the frame of main rotor blade 72, and they may be identical elements or may have distinct properties for certain applications. Likewise, sliders 78a-b may be identical or have distinct properties for certain applications. Linear actuators 74a-b each has an elongated shape with a lengthwise axis 75a-b that is generally oriented parallel with span-wise axis 73 of main rotor blade 72. In contrast to linear actuators 38a-b in FIG. 3, linear actuators 74a-b are generally oriented in series along the span of main rotor blade 72.

In actuator system 70, a crank 80 is connected to sliders 78a-b. Crank 80 includes a beam element 82, a pivot element 84, and an arm element 86. Extension elements 79a-b may be used to connect sliders 78a-b to beam element 82. Examples of pivot element 84 include a conventional bearing with rolling elements, an elastomeric element, a sleeve bushing, or a structural flexure. Pivot element 84 may be positioned coincident with beam element 82, or may be positioned a distance L relative to beam element 82, as shown in FIG. 6. By adjusting distance L, the large centrifugal force acting on sliders 78a-b may be used advantageously to create a negative stiffness spring effect, wherein the negative spring constant, k, is proportional to the centrifugal force CF, distance L, and angular displacement $\theta$ ($-k=CF*L*\sin(\theta)/\theta$). The negative spring effect may counteract aerodynamic forces and reduce actuator power requirements, thereby also potentially reducing the mass of actuator system 70. Arm element 86 may be rigidly attached to beam element 82, or beam element 82 and arm element 86 may be fabricated as a single element.

During rotation of main rotor blade 72, the centrifugal forces are carried across beam element 82 and reacted by pivot element 84, effectively canceling the tendency of sliders 78a-b to sling outward because of the centrifugal forces. Crank 80 is similar to a common bell crank, and as it rotates it converts the span-wise motion of sliders 78a-b into chord-wise motion that may be used to manipulate an active element, such as flap 88, which is connected to arm element 86 through a connecting rod 90 or similar linkage.

In operation, sliders 78a-b are actuated such that each reciprocates generally parallel to axis 73 and slider 78a moves opposite to slider 78b. Thus, as slider 78a moves in the outboard direction of main rotor blade 72, slider 78b moves inboard. And as slider 78a moves outboard and slider 78b moves inboard, crank 80 rotates about pivot element 84, causing arm element 86 to advance toward trailing edge 92 of main rotor blade 72. The movement of arm element 86 toward trailing edge 92 in turn causes connecting rod 90 to act on flap 88, which may rotate about axis 89.

Conversely, as slider 78a moves inboard and slider 78b moves outboard, crank 80 rotates in the opposite direction about pivot element 84, causing arm element 86 to retreat from trailing edge 92. The movement of arm element 86 away from trailing edge 92 in turn causes connecting rod 90 to act on flap 88, which may rotate about axis 89.

Figure 7:
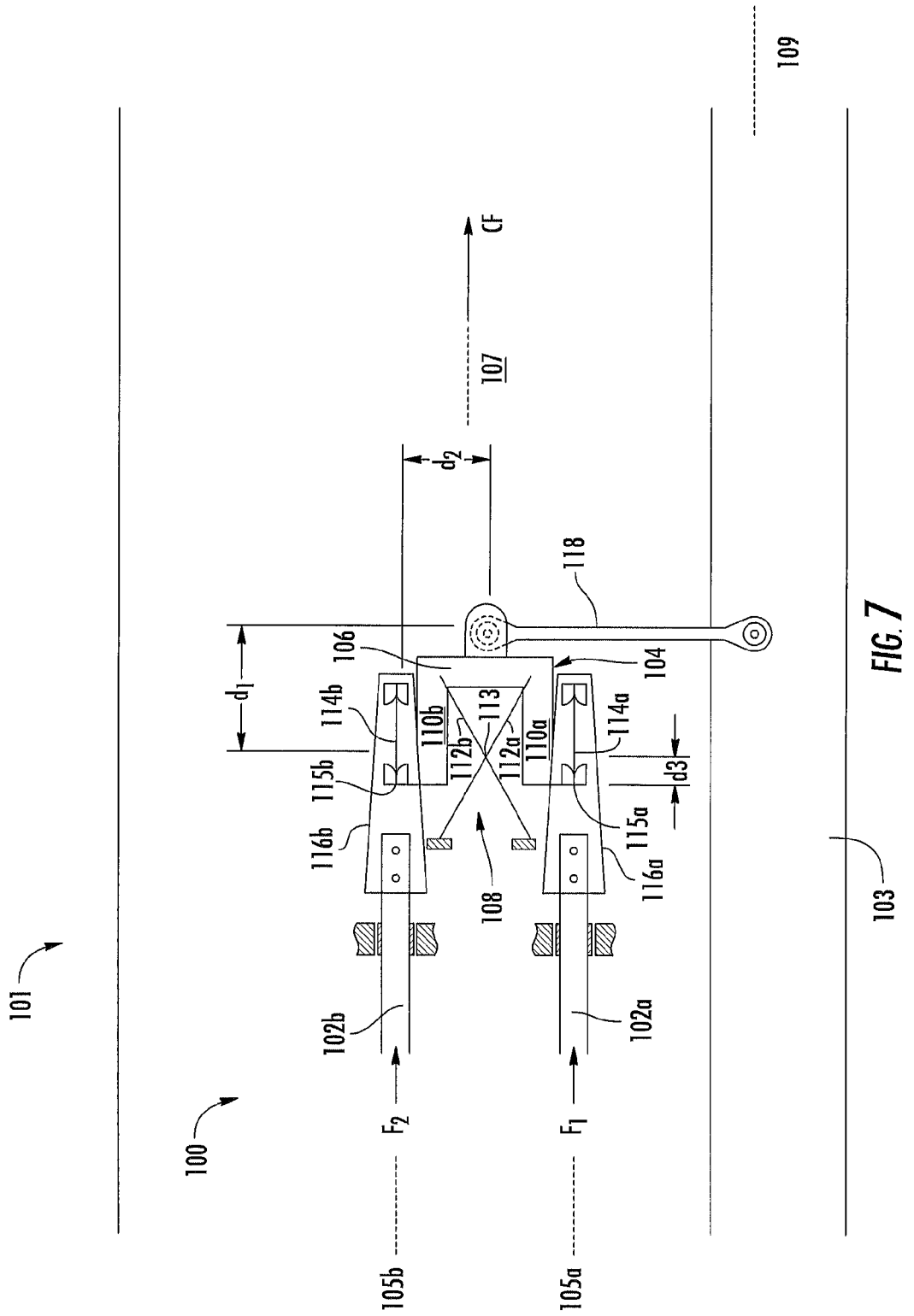
FIG. 7 is a simple schematic of an example embodiment of an actuator system having a cross-axis flexure pivot element and parallel actuators, according to the present specification.

FIG. 7 is a simple schematic of an example embodiment of an actuator system 100 having a cross-axis flexure pivot element, which may be deployed in a main rotor blade 101 or other wing structure having an active element 103. A cross-axis flexure pivot element may simulate a pinned joint while providing certain potential advantages over alternative elements, such as reducing weight and moving parts. A cross-axis flexure pivot element may also be advantageous where high frequency motion and low hysteresis is needed. Actuator system 100 may include moving or sliding elements, such as sliding elements 102a-b, which may be driven by input forces F1 and F2, respectively. Sliding elements 102a-b may be identical or have distinct properties for certain applications. Sliding elements 102a-b each has an elongated shape with a lengthwise axis 105a-b that may be oriented parallel with a span-wise axis 107 of main rotor blade 101. In the example embodiment of FIG. 7, sliding elements 102a-b are also generally oriented parallel to each other along the span of main rotor blade 101.

In actuator system 100, a crank 104 may be connected to sliding elements 102a-b. Crank 104 includes a beam element 106, a cross-axis flexure pivot element 108, and arm elements 110a-b. Cross-axis flexure pivot element 108 may include flexure straps 112a-b, which may be made of fiberglass or other suitable flexure material. Each flexure strap 112a-b can be fastened on one end to crank 104, and on the other end to the frame of main rotor blade 101 or other fixture that may be rigidly attached to the frame. The flexure straps 112a-b intersect at a pivot point 113. Arm elements 110a-b may each be fastened to flexure straps 114a-b, respectively, which may in turn be fastened to sleeve elements 116a-b. The use of flexure straps 114a-b for connecting crank 104 to sleeve elements 116a-b allows transverse displacement between crank 104 and sliding elements 102a-b. Each sleeve element 116a-b may be fastened to a sliding element 102a-b, respectively. The length of flexure straps 114a-b may be adjusted to control the offset d3 between pivot point 113 and the points of attachment 115a-b with arm elements 110a-b. The offset d3 may be used advantageously to create a negative stiffness spring effect as discussed above. The negative spring effect may counteract aerodynamic forces and reduce actuator power requirements, thereby also potentially reducing the mass of actuator system 100. Arm elements 110a-b may be rigidly attached to beam element 106, or beam element 106 and arm elements 110a-b may be fabricated as a single element. A link element 118 may be fastened on one end to crank 104 and on the other to active element 103.

In operation, sliding elements 102a-b may be actuated such that each reciprocates generally parallel to a span-wise axis of a wing structure and sliding element 102a moves opposite to sliding element 102b. Thus, as sliding element 102a moves in the outboard direction of a main rotor blade, sliding element 102b moves inboard. And as sliding element 102a moves outboard and sliding element 102b moves inboard, crank 104 may rotate about pivot point 113, causing beam element 106 to translate in a first direction (e.g., away from a trailing edge). The movement of beam element 106 in turn may cause link element 118 to act on active element 103, which may rotate about an axis 109.

Conversely, as sliding element 102a moves inboard and sliding element 102b moves outboard, crank 104 may rotate in the opposite direction about pivot point 113, causing beam element 106 to translate in a second direction (e.g., toward a trailing edge). The movement of beam element 106 in turn may cause link element 118 to act on active element 103, which may rotate about axis 109.

Figure 8:
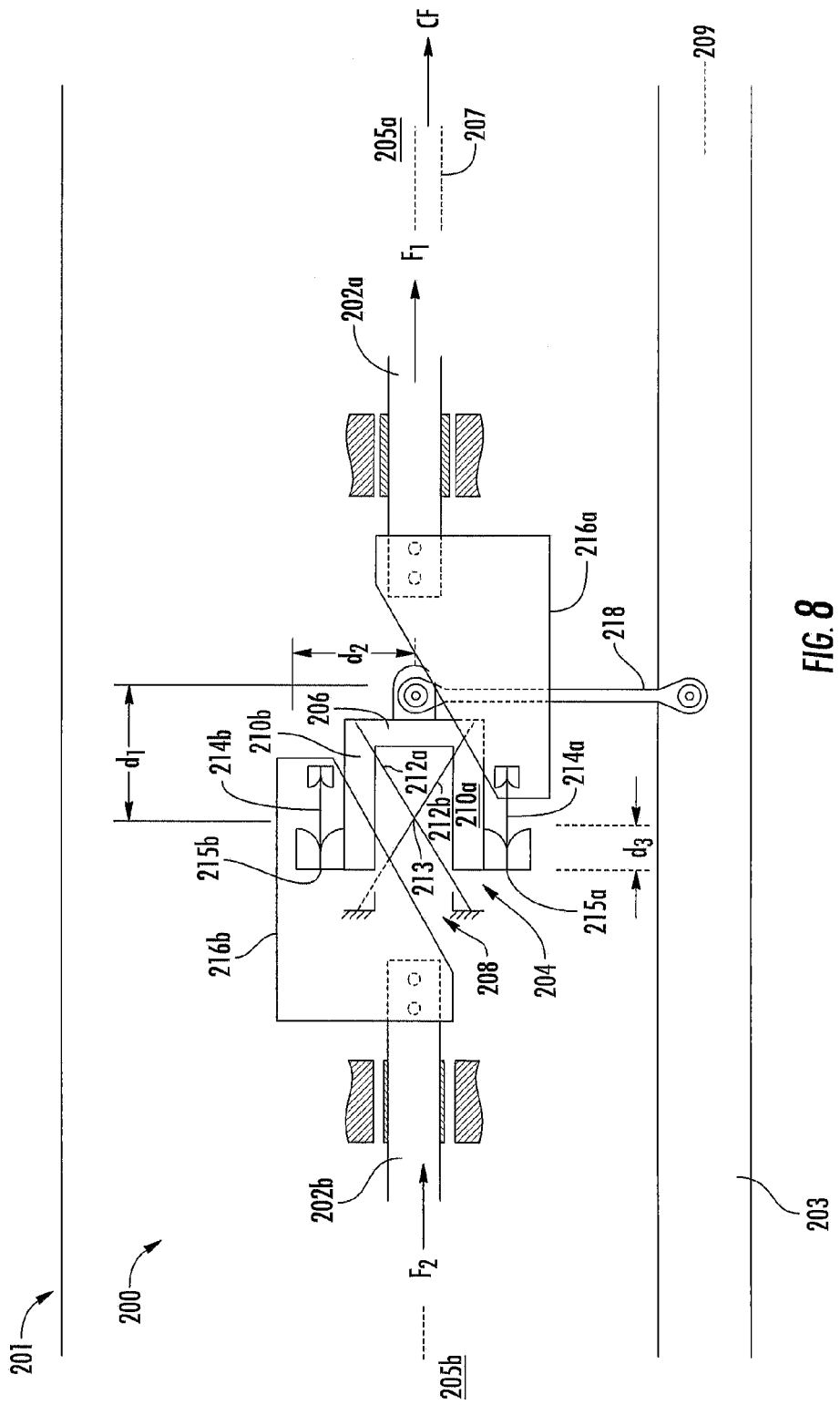
FIG. 8 is a simple schematic of an example embodiment of an actuator system having a cross-axis flexure pivot element and serial actuators, according to the present specification.

FIG. 8 is a simple schematic of an example embodiment of an actuator system 200 having a cross-axis flexure pivot element, which may be deployed in a main rotor blade 201 or other wing structure having an active element 203. Actuator system 200 may include moving or sliding elements, such as sliding elements 202a-b, which may be driven by input forces F1 and F2, respectively. Sliding elements 202a-b may be identical or have distinct properties for certain applications. Sliding elements 202a-b each has an elongated shape with a lengthwise axis 205a-b that may be oriented parallel with a span-wise axis 207 of main rotor blade 201. In the example embodiment of FIG. 8, sliding elements 202a-b are also generally oriented in series with each other along the span of main rotor blade 201.

In actuator system 200, a crank 204 may be connected to sliding elements 202a-b. Crank 204 includes a beam element 206, a cross-axis flexure pivot element 208, and arm elements 210a-b. Cross-axis flexure pivot element 208 may include flexure straps 212a-b, which may be made of fiberglass or other suitable flexure material. Each flexure strap 212a-b may be fastened on one end to crank 204, and on the other end to the frame of main rotor blade 201 or other fixture that may be rigidly attached to the frame. The flexure straps 212a-b intersect at a pivot point 213. Arm elements 210a-b may be each fastened to flexure straps 214a-b, respectively, which may be in turn fastened to sleeve elements 216a-b. The use of flexure straps 214a-b for connecting crank 204 to sleeve elements 216a-b allows transverse displacement between crank 204 and sliding elements 202a-b. Each sleeve element 216a-b may be fastened to a sliding element 202a-b, respectively. The length of flexure straps 214a-b may be adjusted to control the offset d3 between pivot point 213 and the points of attachment 215a-b with arm elements 210a-b. The offset d3 may be used advantageously to create a negative stiffness spring effect as discussed above. The negative spring effect may counteract aerodynamic forces and reduce actuator power requirements, thereby also potentially reducing the mass of actuator system 200. Arm elements 210a-b may be rigidly attached to beam element 206, or beam element 206 and arm elements 210a-b may be fabricated as a single element. A link element 218 may be fastened on one end to crank 204 and on the other to active element 203.

In operation, sliding elements 202a-b may be actuated such that each reciprocates generally parallel to a span-wise axis of a wing structure and sliding element 202a moves opposite to sliding element 202b. Thus, as sliding element 202a moves in the outboard direction of a main rotor blade, sliding element 202b moves inboard. And as sliding element 202a moves outboard and sliding element 202b moves inboard, crank 204 may rotate about pivot point 213, causing beam element 206 to translate in a first direction (e.g., away from a trailing edge). The movement of beam element 206 in turn may cause link element 218 to act on active element 203, which may rotate about an axis 209.

Conversely, as sliding element 202a moves inboard and sliding element 202b moves outboard, crank 204 rotates in the opposite direction about pivot point 213, causing beam element 206 to translate in a second direction (e.g., toward a trailing edge). The movement of beam element 206 in turn causes link element 218 to act on active element 203, which may rotate about axis 209.

Figure 9:
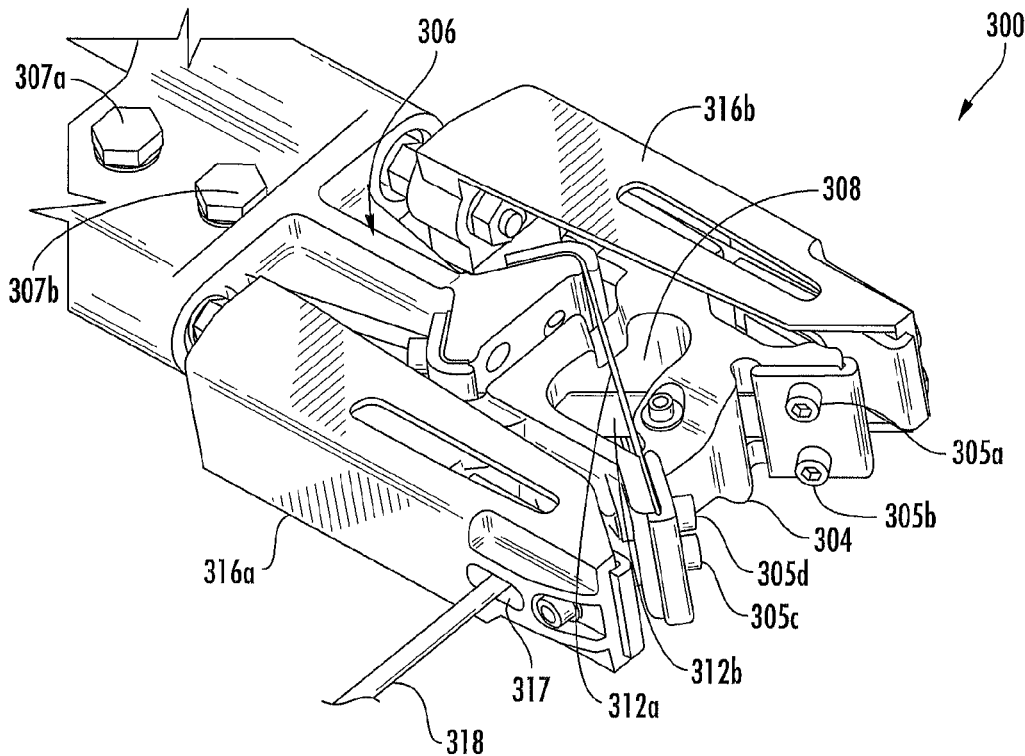
FIG. 9 is a perspective view of an example embodiment of an assembled actuator system having a cross-axis flexure pivot element and parallel actuators, according to the present specification.

FIG. 9 is a perspective view of an example embodiment of an assembled actuator system 300 according to the present specification. Actuator system 300 is representative of a system having a parallel configuration of linear actuators, similar to the system illustrated in FIG. 3 or FIG. 7. As shown, actuator system 300 includes a crank 304, a base 306, and a pivot element 308. Pivot element 308 generally includes flexure straps 312a-b, which may be fastened or clamped on one end to crank 304 with fasteners 305a-d and on the other to base 306. Base 306 may be fastened to a wing frame (not shown) with bolts 307a-b. Each sleeve element 316a-b may be fastened near one end to a sliding element (not visible) and near the other end to another flexure strap (not visible). Similar to flexure straps 114a-b in FIG. 7, these flexure straps may be fastened on the other end to crank 304. Sleeve element 316a may further include a hole 317 to permit passage of a link element 318 from crank 304 to an active element (not shown).

Figure 10:
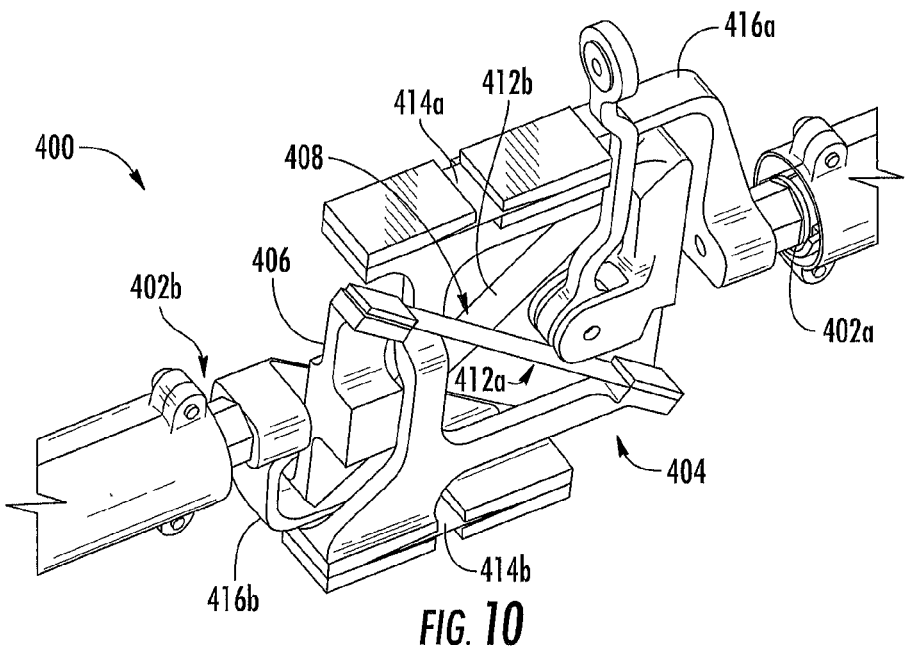
FIG. 10 is a perspective view of an example embodiment of an assembled actuator system having a cross-axis flexure pivot element and serial actuators, according to the present specification.

FIG. 10 is a perspective view of another example embodiment of an assembled actuator system 400 according to the present specification. Actuator system 400 is representative of a system having a serial configuration of linear actuators, similar to the system illustrated in FIG. 6 or FIG. 8. As shown, actuator system 400 includes a crank 404, a base 406, and a pivot element 408. Pivot element 408 generally includes flexure straps 412a-b, which may be fastened or clamped on one end to crank 404 and on the other to base 406. Each sleeve element 416a-b may be fastened near one end to a sliding element 402a-b, respectively, and near the other end to another flexure strap 414a-b, respectively. Similar to flexure straps 214a-b in FIG. 8, these flexure straps may be fastened on the other end to crank 404.

Figure 11:
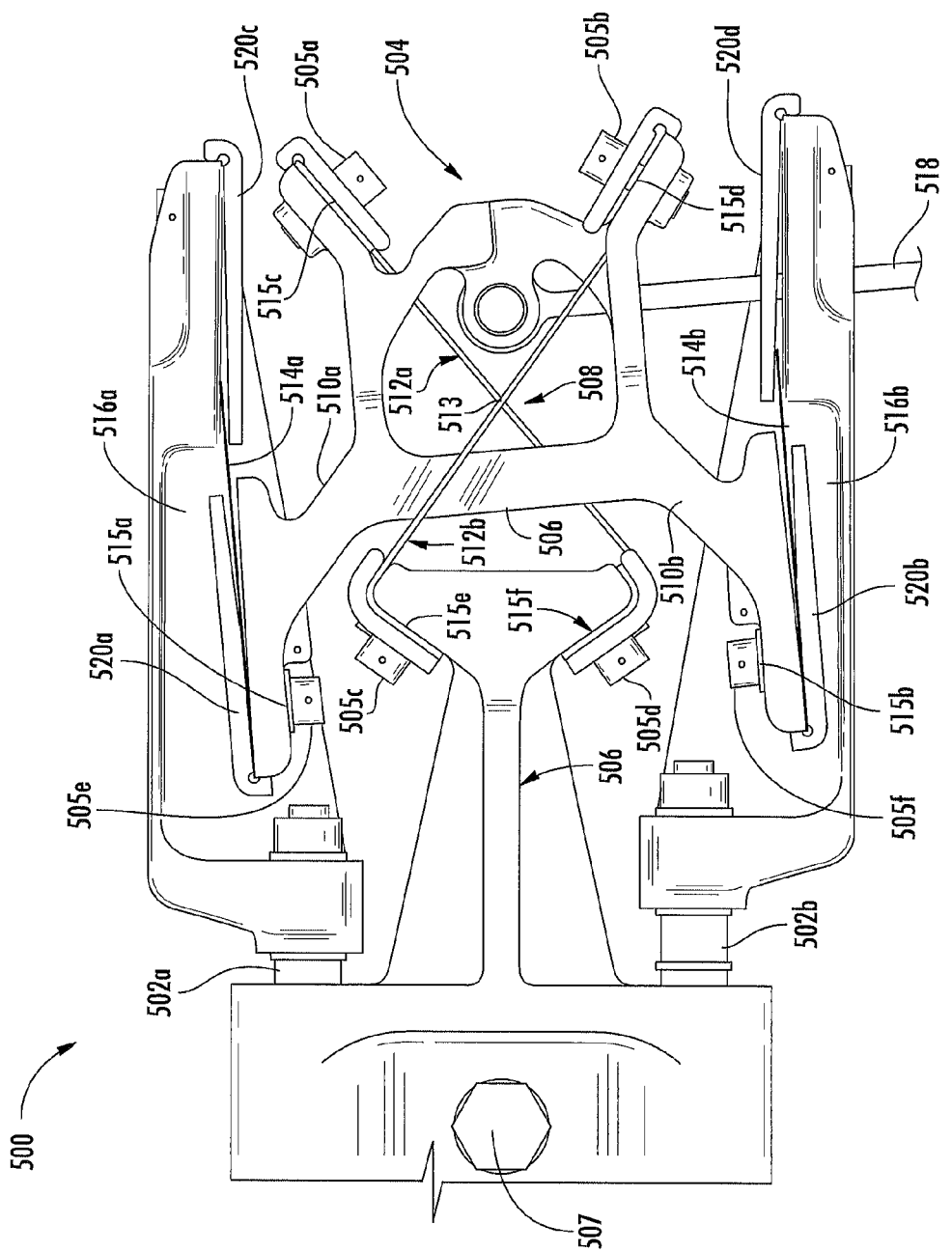
FIG. 11 is a top view of an example embodiment of an assembled actuator system having a cross-axis flexure pivot element and parallel actuators, according to the present specification.

FIG. 11 is a top view of an example embodiment of an actuator system 500, according to the present specification. Actuator system 500 is representative of a system having a parallel configuration of linear actuators, similar to the system illustrated in FIG. 9. As shown, actuator system 500 includes a crank 504, a base 506, and a pivot element 508. Crank 504 is configured with multiple attachment points 515a-d, and may include a beam element 506 and arm elements 510a-b. Pivot element 508 generally includes flexure straps 512a-b, which may be fastened or clamped at attachment points 515c-d to crank 504 with fasteners 505a-b and at attachment points 515e-f to base 506 with fasteners 505c-d. Flexure straps 512a-b intersect at a pivot point 513, and the length of flexure straps 512a-b may be adjusted to control the offset between pivot point 513 and attachment points 515e-f. The offset may be used advantageously to create a negative stiffness spring effect as discussed above. Base 506 may be fastened to a wing frame (not shown) with bolts, such as bolt 507. Each sleeve element 516a-b is fastened near one end to a sliding element 502a-b, respectively, and near the other end to flexure straps 514a-b, respectively. Flexure straps 514a-b may also be fastened to crank 504 with fasteners 505e-f at attachment points 515a-b, respectively. Shoe elements 520a-d may be used to control curvature and bending strain. Sleeve element 516b may further include a hole (not visible) to permit passage of a link element 518 from crank 504 to an active element (not shown).

Figure 12:
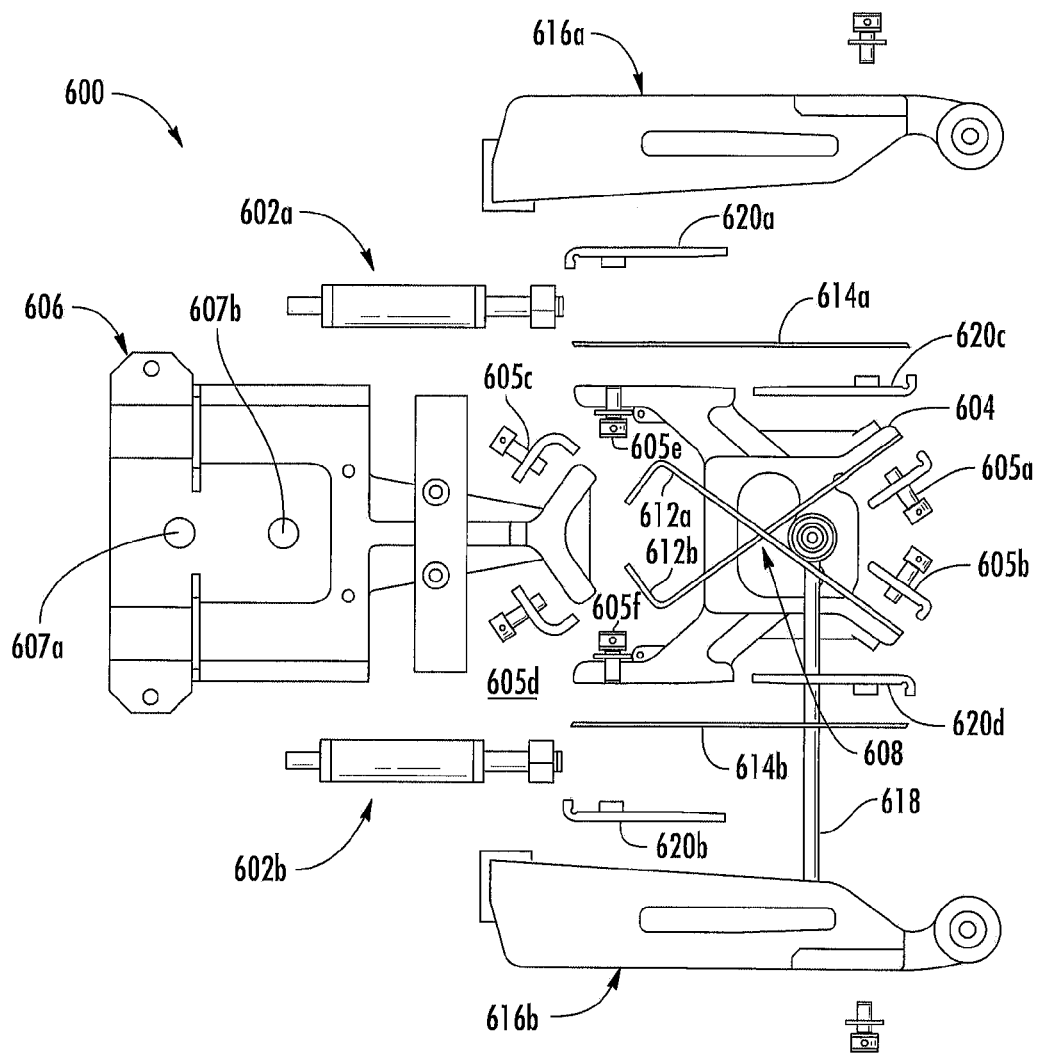
FIG. 12 is an exploded top view of an example embodiment of an assembled actuator system having a cross-axis flexure pivot element and parallel actuators, according to the present specification.

FIG. 12 is an exploded top view of an actuator system 600, according to the present specification. Actuator system 600 is also representative of a system having a parallel configuration of linear actuators. As shown, actuator system 600 includes linear actuators 602a-b, a crank 604, a base 606, and a pivot element 608. Pivot element 608 generally includes flexure straps 612a-b, which may be fastened or clamped on one end to crank 604 with fasteners 605a-b and on the other to base 606 with fasteners 605c-d. Base 606 may be fastened to a wing frame (not shown) by inserting bolts (not shown) through holes 607a-b. Each sleeve element 616a-b may be fastened near one end to a sliding element 602a-b, respectively, and near the other end to flexure straps 614a-b, respectively. Flexure straps 614a-b may also be fastened to crank 604 with fasteners 605e-f. Shoe elements 620a-d may be used to control curvature and bending strain. Sleeve element 616b may further include a hole (not visible) to permit passage of a link element 618 from crank 604 to an active element (not shown).

Figure 13:
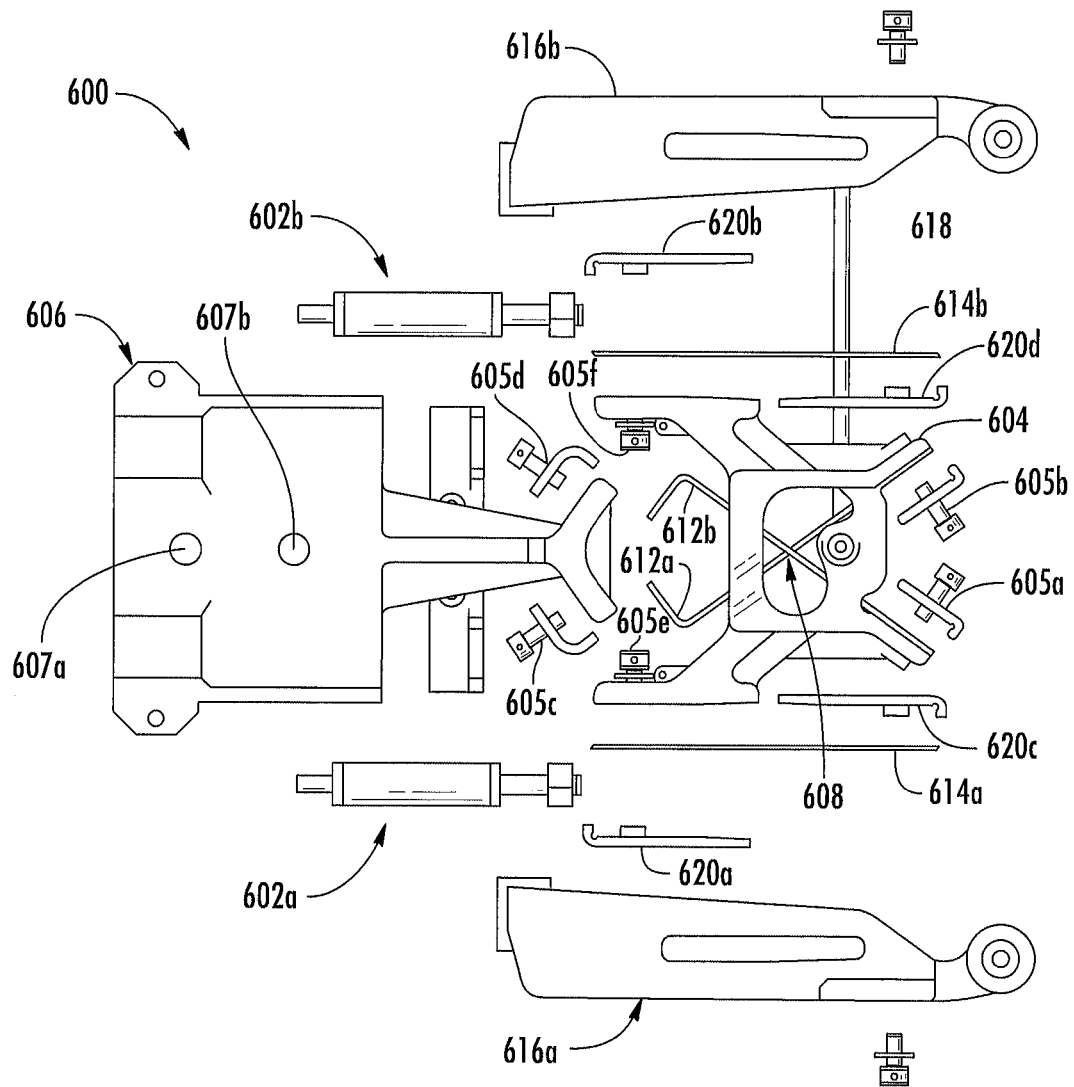
FIG. 13 is an exploded bottom view of the example embodiment in FIG. 12.

FIG. 13 is an exploded bottom view of actuator system 600.

Alternatively or additionally, an actuator system may include hydraulic, piezoelectric, or electromechanical components. For example, a linear actuator may have a fixed element such as a hydraulic cylinder and a moving element such as a hydraulic ram.

The system and apparatus described herein provides significant advantages, including: (1) reducing or eliminating the adverse effects of centrifugal forces on linear actuators in a span-wise orientation; (2) more powerful motors; (3) longer stroke and greater bandwidth than other systems; and (4) improved mass distribution characteristics.

Certain example embodiments have been shown in the drawings and described above, but variations in these embodiments will be apparent to those skilled in the art. The principles disclosed herein are readily applicable to a variety of aircraft, including many types of rotary wing, tilt-rotor, and fixed wing aircraft, as well as a variety of other active wing elements, including leading edge droops. The preceding description is for illustration purposes only, and the claims below should not be construed as limited to the specific embodiments shown and described.

The invention claimed is:

1. An apparatus for actuating a moveable member on a wing member, comprising:
a base;
a first linear actuator having a first fixed element and a first sliding element movable within the base;
a second linear actuator having a second fixed element and a second sliding element movable within the base;
a crank element coupled to a link element at a link attachment location, the link element extending approximately chordwise, the link element being operably associated with the moveable member;

a first sleeve element connected to the first sliding element and to the crank element;

a second sleeve element connected to the second sliding element and to the crank element;

a first flexure strap and a second flexure strap each connected to the base and to the crank element such that the first flexure strap and the second flexure strap diagonally cross each other at a pivot point, the pivot point being located an approximately spanwise distance from the link attachment location.

2. The apparatus of claim 1, wherein the first linear actuator and the second linear actuator are electromagnetic actuators.

3. The apparatus of claim 1, wherein the first linear actuator is aligned parallel to the second linear actuator.

4. The apparatus of claim 1, wherein the first linear actuator is aligned in series with the second linear actuator.

5. The apparatus of claim 1, wherein the first flexure strap is connected to the base at first beam attachment point and the second flexure strap is connected to the base at a second beam attachment point.

6. An aircraft, comprising:
a fuselage;
a wing having span-wise axis, a frame connected to the fuselage, and an active element; and
an actuator system connected to the frame and the active element, the actuator system having sliding elements movable along an axis parallel to the span-wise axis of the wing and a cross-axis flexure pivot element;
wherein the sliding elements are connected to fixed elements and a crank element, the crank element comprising a beam element offset from a pivot point of the cross-axis flexure pivot element so that the crank element is rotatable about the pivot point with a negative stiffness under an external force that tends to pull the sliding elements away from the fixed elements; and
wherein the cross-axis flexure pivot element comprises a first flexure strap and a second flexure strap each connected to the base and to the crank element such that the first flexure strap and the second flexure strap diagonally cross each other at a pivot point.

7. An aircraft, comprising:
a fuselage;
a wing having a span-wise axis, a frame connected to the fuselage, and an active element;
a base connected to the frame;
a first linear actuator having a first fixed element connected to the base and a first sliding element movable within the base;
a second linear actuator having a second fixed element connected to the base and a second sliding element movable within the base;
a crank element;
a first sleeve element connected to the first sliding element and to the crank element;

a second sleeve element connected to the second sliding element and to the crank element;
a cross-axis flexure pivot element connected to the base and to the crank element at the sleeve elements; and
a link element connected on a first end to the crank element and on a second end to the active element.

8. The aircraft of claim 7, wherein the first sliding element and the second sliding element are aligned to be movable along an axis parallel to the span-wise axis of the wing.

9. The aircraft of claim 7, wherein the wing is rotatable about a hub connected to the fuselage.

10. The aircraft of claim 7, wherein the wing is rotatable about a hub connected to the fuselage and the first sliding element and the second sliding element are aligned to be movable along an axis parallel to the span-wise axis of the wing.

11. The aircraft of claim 7, wherein the first linear actuator and the second linear actuator are electromagnetic motors.

12. The apparatus of claim 7, wherein the first linear actuator is aligned parallel to the second linear actuator.

13. The aircraft of claim 7, wherein the first linear actuator is aligned in series with the second linear actuator.

14. The aircraft of claim 7, wherein:
the wing is rotatable about a hub connected to the fuselage;
the first sliding element and the second sliding element are aligned to be movable along an axis parallel to the span-wise axis of the wing; and
the first linear actuator is aligned parallel to the second linear actuator.

15. The aircraft of claim 7, wherein:
the wing is rotatable about a hub connected to the fuselage;
the first sliding element and the second sliding element are aligned to be movable along an axis parallel to the span-wise axis of the wing;
the first linear actuator is aligned parallel to the second linear actuator; and
the cross-axis flexure pivot element comprises an offset pivot point.

16. The aircraft of claim 7, wherein:
the wing is rotatable about a hub connected to the fuselage;
the first sliding element and the second sliding element are aligned to be movable along an axis parallel to the span-wise axis of the wing; and
the first linear actuator is aligned in series with the second linear actuator.

17. The aircraft of claim 7, wherein:
the wing is rotatable about a hub connected to the fuselage;
the first sliding element and the second sliding element are aligned to be movable along an axis parallel to the span-wise axis of the wing;
the first linear actuator is aligned in series with the second linear actuator; and
the cross-axis flexure pivot element comprises an offset pivot point.

* * * * *